United States Patent [19]
McCarthy et al.

[11] Patent Number: 5,713,233
[45] Date of Patent: Feb. 3, 1998

[54] VANE ADJUSTMENT MACHINE

[75] Inventors: James F. McCarthy, Eden Prairie; Loren L. Davis, Vadnais Heights, both of Minn.

[73] Assignee: Sifco Custom Machining Company, Minneapolis, Minn.

[21] Appl. No.: 697,902

[22] Filed: Aug. 30, 1996

[51] Int. Cl.⁶ .................................................. B24C 51/00
[52] U.S. Cl. .......................... 72/31.02; 72/18.3; 72/20.1; 72/311; 72/447; 72/342.94; 29/889.1
[58] Field of Search ...................................... 72/16.4, 16.5, 72/18.2, 18.3, 20.1, 31.01, 31.02, 306, 311, 447, 342.94, 389.4, 389.6; 29/23.51, 889.1

[56] References Cited

U.S. PATENT DOCUMENTS

| | | | |
|---|---|---|---|
| 2,898,442 | 8/1959 | Anderson | 29/23.51 |
| 4,012,938 | 3/1977 | Brändstrom . | |
| 4,014,495 | 3/1977 | Oda et al. . | |
| 4,087,996 | 5/1978 | Paille . | |
| 4,222,259 | 9/1980 | Junes . | |
| 4,252,008 | 2/1981 | Dibbens | 72/389.6 |
| 4,383,870 | 5/1983 | Creech . | |
| 4,448,405 | 5/1984 | Cipolla . | |
| 4,646,553 | 3/1987 | Tufte et al. . | |
| 4,778,329 | 10/1988 | Phillips . | |
| 4,838,069 | 6/1989 | Walker et al. . | |
| 4,951,390 | 8/1990 | Fraser et al. | 29/889.1 |
| 5,044,190 | 9/1991 | Hoff et al. . | |
| 5,046,245 | 9/1991 | Weetman . | |
| 5,092,151 | 3/1992 | Catti et al. | 72/389.4 |
| 5,235,745 | 8/1993 | Fraser | 29/889.1 |
| 5,315,856 | 5/1994 | Mackey | 29/889.1 |
| 5,377,521 | 1/1995 | Mackey . | |
| 5,499,524 | 3/1996 | Len | 72/31.02 |

FOREIGN PATENT DOCUMENTS

| | | | |
|---|---|---|---|
| 0311522 | 4/1989 | European Pat. Off. | 72/447 |

*Primary Examiner*—Lowell A. Larson
*Assistant Examiner*—Ed Tolan
*Attorney, Agent, or Firm*—Palmatier, Sjoquist, Helget Voigt, P.A.

[57] ABSTRACT

The present invention is a vane adjustment machine for adjusting contoured vanes on a vane ring. The vane adjustment machine has a support structure with a bench top and a free-floating suspension. The bench top supporting a programmable rotary table which is electrically actuated to rotate a removably mounted vane assembly to bring each contoured vane into a position to be dimensionally measured, heated, and bent. The vane adjustment machine has a trace probe mounted adjacent to the rotary table for engaging each contoured vane and measuring its relative position radially and axially. A torch is mounted adjacent the rotary table to heat each contoured vane individually. A non-contact infrared sensor is on the bench top adjacent to the torch for measuring the temperature of a heated contoured vane. A bending head is suspended by the free-floating suspension over the vane ring to individually engage the trailing edge of each individual contoured vane and bend the-trailing edge to adjust the contoured vane. The bending head has a jaw assembly comprising a fixed jaw and a movable jaw. The jaw assembly engages the trailing edge with two feet and a center portion to bend the contoured vane. The jaw assembly has an adjustment for changing the spacing and the angular relationship between the feet to accommodate a variety of different sized contoured vanes. The fixed jaw and the moving jaw may be configured to open or close an exit area defined by the trailing edge of the contoured vane and the inner and outer nozzle rings.

20 Claims, 6 Drawing Sheets

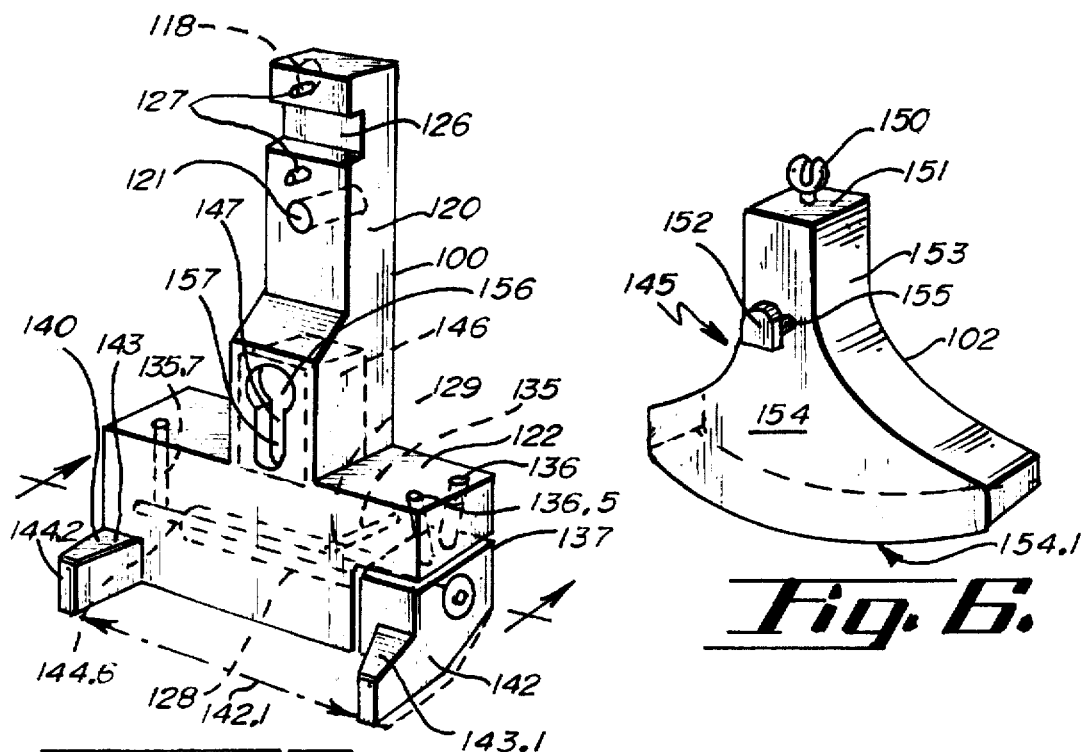
Fig. 5.
Fig. 6.
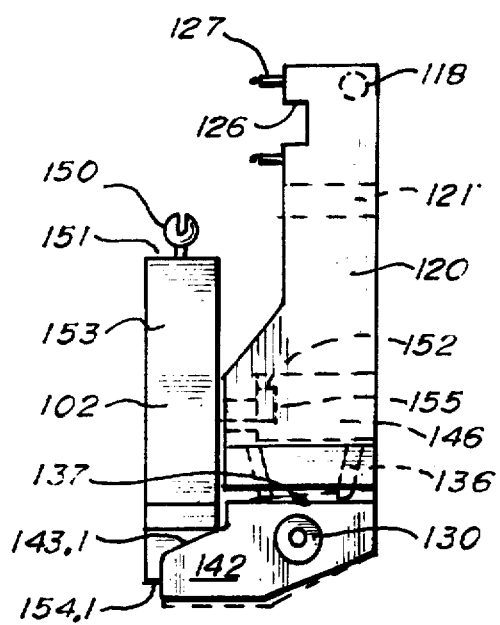
Fig. 3.
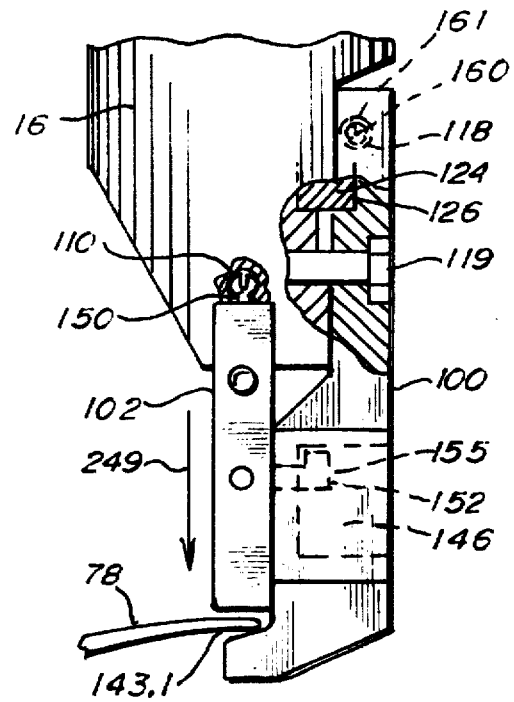
Fig. 10.

VANE ADJUSTMENT MACHINE

BACKGROUND OF THE INVENTION

The present invention relates to a vane adjustment machine for adjusting vanes used in turbine engines. The turbines in modern jet engines consist of one or more stages located downstream from the engine burner section. The turbines extract kinetic energy from the expanding gases as the gases come from the burner section. The turbines convert this energy into shaft horsepower to drive the compressor, engine accessories, and/or a propeller shaft.

The axial flow turbine consists of two main elements, sets of rotatable turbine rotors, or wheels, and sets of stationary contoured vanes referred to as vane rings. The vane rings consist of a plane of contoured vanes concentric with an axis of the turbine and set at an angle to form a series of small nozzles. The contoured vanes discharge hot gases onto the blades of a rotating turbine wheel causing the turbine wheel to rotate. The exit area of each of the small nozzles on the vane ring is the most critical part of the turbine design and is defined by the opening between adjacent contoured vanes.

If the exit area is too large, the turbine will not operate at its best efficiency. If the exit area is too small, the nozzle will choke and loose efficiency under maximum thrust operating conditions. The contoured vanes have a trailing edge which is bent to adjust the size of the exit area. Prior methods of bending the trailing edges caused cracking and distortion of the inner and outer nozzle rings at the attachment point to the contoured vanes. A brass or steel crowbar has been used to bend the trailing edge of the contoured vanes to enlarge the size of the exit area. In addition, an arbor press has been used to bend the trailing edge of a contoured vane to reduce the size of an exit area. This force applied to the trailing edge of a contoured vane affected the integrity of the vane ring. In addition, accurate repeatable bending of each contoured edge in a vane ring was difficult using these tools and methods.

Vane bending tools have also been disclosed for engaging and bending the trailing edge of a contoured vane. These tools were very expensive and required expensive machining processes to adjust the tools or to machine new tools for accommodating variations in the casting size or deformation of the vane rings. Furthermore, different tools were required to bend different vane rings even for small variations in size.

SUMMARY OF THE INVENTION

The present invention is a vane adjustment machine for adjusting contoured vanes on a vane ring. The vane adjustment machine has a support structure with a bench top and a free-floating suspension. The bench top supporting a programmable rotary table which is electrically actuated to rotate a removably mounted vane assembly to bring each contoured vane into a position to be dimensionally measured, heated, and bent. The vane adjustment machine has a trace probe mounted adjacent to the rotary table for engaging each contoured vane and measuring its relative position radially and axially. A torch is mounted adjacent the rotary table to heat each contoured vane individually. A non-contact infrared sensor is on the bench top adjacent to the torch for measuring the temperature of a heated contoured vane. A bending head is suspended by the free-floating suspension over the vane ring to individually engage the trailing edge of each individual contoured vane and bend the trailing edge to adjust the contoured vane. The bending head has a jaw assembly comprising a fixed jaw and a movable jaw. The jaw assembly engages the trailing edge with two feet and a center portion to bend the contoured vane. The jaw assembly has an adjustment for changing the spacing and the angular relationship between the feet to accommodate a variety of different sized contoured vanes. The fixed jaw and the moving jaw may be configured to open or close an exit area defined by the trailing edge of the contoured vane and the inner and outer nozzle rings. The bending head has an actuator bearing against the movable jaw and a position sensor in communication with the movable jaw to measure the movement of the actuator and amount of deflection retained by the contoured vane. A programmable logic controller on the vane adjustment machine controls the rotary position of the vane ring and indexes each contoured vane to the probe for measurement, to a position proximate the torch for heating, and to a position for engagement by the bending head.

An object of the present invention is to provide a flexible vane adjustment machine for automating the adjustment of contoured vanes.

A feature of the present invention is an adjustable jaw assembly on the vane adjustment machine for accommodating different lengths of contoured vanes due to casting variations.

Another feature of the invention is that one jaw set may be able to accommodate more than one vane ring part number due to the ability of the jaws to change the width and angular relationships of the contact feet.

Another feature of the invention is that prototype jaw proofing may be simplified and reduced in cost by "adjustment" versus "machining" of expensive bend jaws. The cost of tooling is dramatically decreased.

Another feature of the invention is that the contour width, the area of bend change, can be changed to vary the length of bend with a single jaw assembly.

Another advantage of the invention is that vanes with trailing edge openings, hollow vanes, can now be adjusted without crushing same since the feet can be adjusted to locate in the fillet radii of the junction between the airfoil and the inner and outer support rings of the casting.

Another feature and advantage of the invention is that jaw feet can now be removed and repaired independently rather than scrapping the entire jaw piece if they become worn or damaged.

Another advantage of the invention is that new jaw applications can be tried using new configurations of feet by merely fabricating new feet and installing them on the existing expensive jaw body. The jaw feet can be easily removed for modification. This simplifies machining and allows machining on the feet without the rest of the jaw body.

Another feature and advantage of the invention is that multiple machinists, three, can simultaneously work on the jaw body. This configuration speeds-up fabrication and modifications.

Another feature and advantage of the invention is that "extended width" jaws could be made from existing jaws by replacing a jaws' existing feet and the internal adjustment screw to "widen" jaws without scrapping the main jaw body.

An advantage of the invention is that adjustable jaws allow immediate correction of the jaws slipping off the vanes during the bend cycle. The jaw feet can be adjusted to a slightly different angular relationship rather than having to take several machining cuts to achieve the same result.

Another feature and advantage of the invention is an anti-separation device that prevents separation of the two jaws particularly when reaching down to deeply shrouded vane rings. The anti-separation device facilitates use of extra long adjustable jaws.

Another object of the invention is to provide a vane adjustment machine having a bending head suspended into a weightless position to reduce the moment arm reaction reflected by the contoured vane due to the weight of the bending head.

Another object of the present invention is to provide a vane adjustment machine having an adjustable jaw assembly for accommodating different vane rings.

Another feature of the present invention is a vane adjustment machine having a suspension system for holding the bending head in position to engage the trailing edge of the contoured vanes.

Another feature of the present invention is a vane heater to heat and control the temperature of each contoured vane prior to bending.

Another feature of the present invention is a probe for engaging each contoured vane and measuring the relative position of the trailing edge of each contoured vane.

Another feature of the present invention is a rotary table having a motor and an encoder for moving the rotary table in a precise indexed fashion for locating, measuring, heating and bending each contoured vane in the vane ring.

An advantage of the present invention is a reduction in the skill level required to adjust vane rings.

Another advantage of the present invention is a reduction of the time required to adjust all of the contoured vanes in a vane ring.

Another advantage of the present invention is the user may achieve the correct bend in the trailing edges of each contoured vane in a vane ring such that the correct air flow over the vane ring is achieved in one adjustment cycle.

Another advantage of the present invention is a reduction in spare vane ring inventories due to the quick, accurate adjustment available by the vane adjustment machine to adjust vane rings to specified flow areas.

Another advantage of the present invention is a reduction of the cost of tooling due to the adjustable jaw assembly.

Another advantage of the present invention is a uniform bend contour on each contoured vane.

Another advantage of the present invention is reduced scrap and rework due to less cracking of vanes.

BRIEF DESCRIPTION OF THE DRAWINGS

FIG. 5 is a perspective view of a fixed closing jaw.

FIG. 6 is a perspective view of a movable closing jaw.

FIG. 7 is an elevational view of a jaw assembly configured for closing.

FIG. 10 is a side elevation view of a jaw assembly on a bending head.

DETAILED DESCRIPTION OF THE PREFERRED EMBODIMENTS

Figure 1:
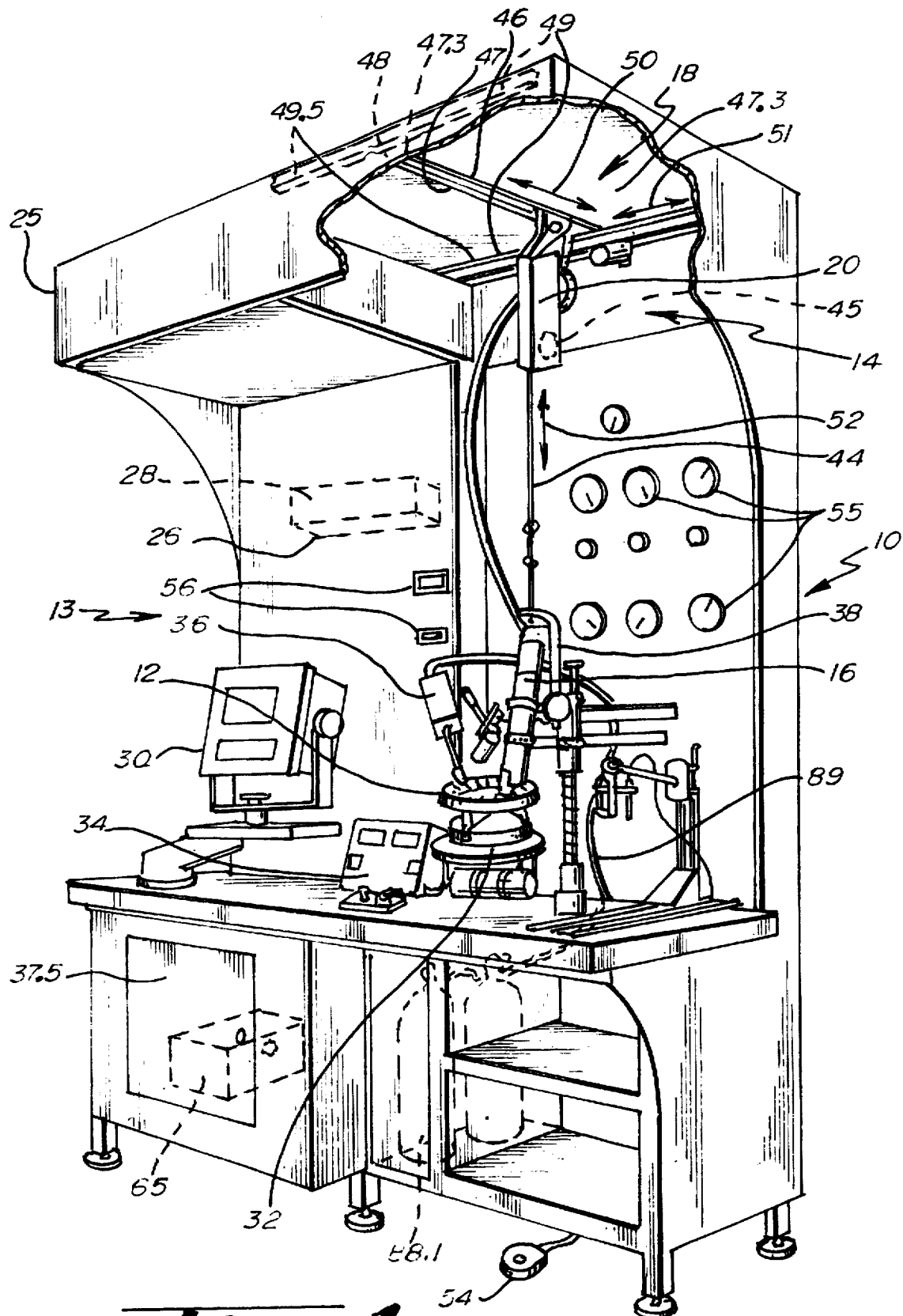
FIG. 1 is a perspective view of the vane adjustment machine.

Referring to FIG. 1, the vane adjustment machine 10 is used to adjust a vane ring 12. The vane adjustment machine 10 generally comprises a support structure 13 and a free-floating suspension indicated in general by the numeral 14 supporting a bending head 16. A jaw assembly 17 (FIG. 2) is on the bending head 16 to adjust the air flow exit areas of the vane ring 12. The gimbaled free-floating suspension 14 is supported by a trolley 18 having a balancer 20 vertically supporting the bending head 16. The vane adjustment machine 10 has a bench top 24 supported by a machine frame 25 in the support structure 13 and an electrical control 26 comprising a programmable controller 28 connected to an operator interface 30. The support structure 13 could comprise structures integral with a building, such as walls or ceiling trusses. A programmable rotary table 32 is mounted on the bench top 24 and connected to the programmable controller 28. The programmable rotary table 32 rotates with respect to the bench top 24.

Figure 2:
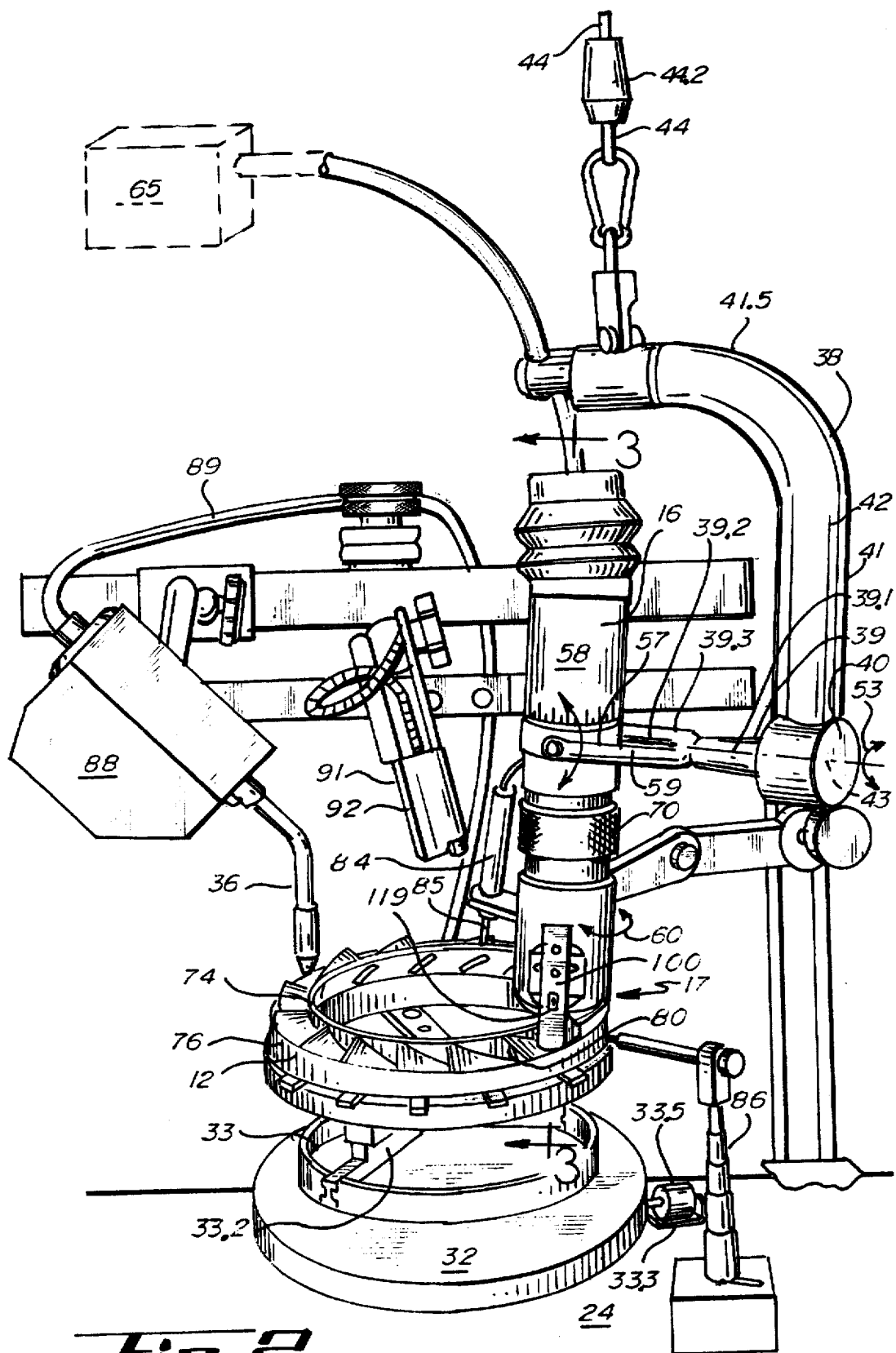
FIG. 2 is a perspective view of the vane ring mounted on the vane adjustment machine.

Referring to FIGS. 1 and 2, the programmable rotary table 32 comprises a mounting surface 33 having a quick-action chuck 33.2 mounted thereon. The vane ring 12 is engaged by the quick-action chuck 33.2. An operator console 34 is connected to the programmable controller 28 (FIG. 1) for controlling the vane heater 36. A fuel compartment 37 and a pneumatic hydraulic compartment 37.5 are located below the bench top 24.

Referring to FIGS. 1 and 2, the free-floating suspension 14 comprises a gimbal arm 38 attached to the bending head 16 and supported by a cable 44. The balancer 20 has a cable adjuster 45 for engaging the cable 44 and supporting the bending head 16 and the gimbal arm 38. The balancer 20 is a Colibri type to allow the bending head 16 to be vertically positioned in a weightless manner to provide a near zero (0) moment arm reaction to be reflected in the vane ring 12 by the weight of the bending head 16.

Referring to FIG. 1, the trolley 18 slidably engages a first trolley track 46 on an upper support bar 47. The upper support bar 47 has two ends 47.3. A linear slide 48 is on each of the two ends 47.3. A second trolley track 49 on the machine frame 25 comprises a pair of substantially parallel slide rails 49.5. Each of the linear slides 48 engages a respective substantially parallel slide rail 49.5 to support the upper support arm and slidably move the upper support arm 47 along the second trolley track 49. The movement of the trolley 18 along the first trolley track 46 defines a first horizontal axis of motion 50. Likewise, the motion of the upper support bar 47 along the second trolley track 49 defines a second horizontal axis of motion 51. The first horizontal axis of motion 50 is substantially perpendicular to the second horizontal axis of motion 51. The cable 44 engaged by the cable adjuster 45 vertically adjusts the position of the bending head 16 defining a vertical axis of motion 52.

Continuing to refer to FIG. 1, the vane adjustment machine 10 also comprises a foot switch 54 for actuating the bending head 16 by an operator using both hands to position the bending head 16. A plurality of pressure indicators 55 are located on the main adjustment machine 10 visually viewable by the operator to indicate hydraulic and pneumatic pressures to an operator. Digital readouts 56 are also mounted on the vane adjustment machine 10 to provide visual indication to the operator of trace probe position or contoured vane temperature. Trace probe position may be measured by the probe 84 (FIG. 2). Temperatures may be measured by the temperature sensor 91 (FIG. 2).

Referring to FIG. 2, a motor 33.3 in the programmable rotary table 32 rotates the rotatable portion 33 and the adjustable quick-action chuck 33.2 to bring each contoured vane 78 into position for adjustment. A rotation position sensor 33.5 is attached to or integral with the motor 33.3 to provide accurate rotation position information to the programmable controller 28 (FIG. 1). The rotation position sensor 33.5 may be an encoder, resolver or other similar device.

Referring to FIGS. 1 and 2, the free-floating suspension 14 comprises a gimbal arm 38 having a Y-shaped bracket 39 engaging the bending head 16. The Y-shaped bracket 39 has a first support member 39.1 rotatably mounted on the gimbal arm 38. A second support member 39.2 and a third support member 39.3 engage opposite sides of a collar 59 on the bending head 16 to pivotally support the bending head 16. The first support member 39.1 is engaged by a housing 40 on the gimbal arm 38. A bearing (not shown) is mounted in the housing 40 between the Y-shaped bracket 39 and the gimbal arm 38 to provide smooth rotational motion of the bending head 16 about a horizontal rotational axis 43. The gimbal arm 38 further comprises a lower portion 41 and an upper portion 41.5. The housing 40 is attached to the lower portion 41. The upper portion 41.5 is connected by a cable 44 and swivel joint 44.2 to the balancer 20. The gimbal arm 38 may have a grippable surface 42 along the length of the gimbal arm 38 comprising a vinyl foam coating or other textured material.

Referring to FIG. 2, the movement of the bending head 16 with respect to the gimbal arm 38 about the horizontal rotational axis 43 in the directions as indicated by double arrow 53. The pivotal connection between the Y-shaped bracket 39 attached to the collar 59 on the housing 58 of the bending head 16 defines a pivotal axis of motion 57. The housing 58 may rotate within the collar 59 to align the jaw assembly 17 to engage the trailing edge 80 of a contoured vane 78. The rotation of the housing 58 with respect to the collar 59 defines an alignment axis of motion 60.

Figure 4A:
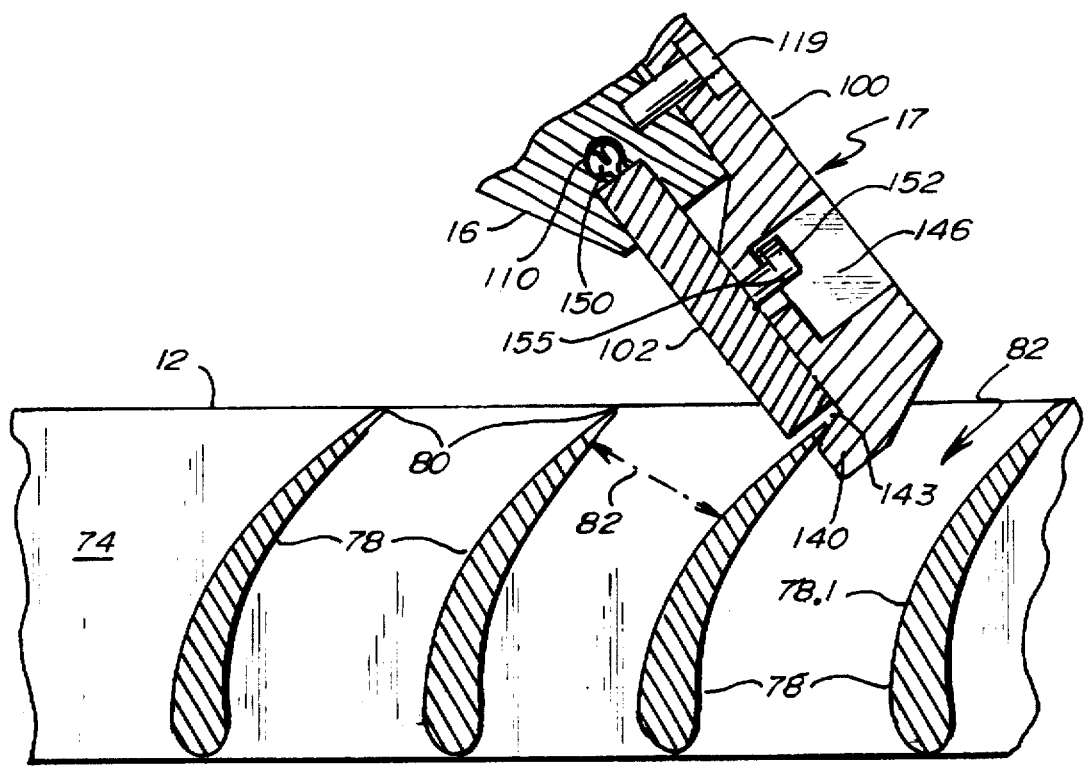
FIG. 4A is a detail sectional view taken at approximately 4A—4A of FIG. 4.
Figure 4:
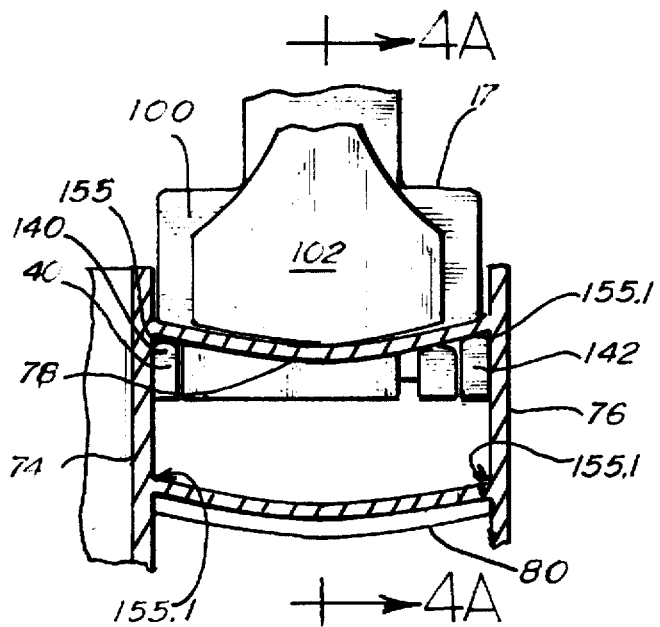
FIG. 4 is a front elevational view of the jaw assembly engaging a contoured vane.

Continuing to refer to FIGS. 2 and 4A, the vane ring 12 comprises an inner nozzle ring 74 and an outer nozzle ring 76. The contoured vane 78 extends between the inner nozzle ring 74 and the outer nozzle ring 76. The trailing edge 80 defines an exit area 82 having a size. The exit area 82 is further defined by an adjacent contoured vane 78.1, the inner nozzle ring 74 and outer nozzle ring 76 (FIG. 4). The size of the exit area 82 is adjusted by bending the trailing edge 80 of the respective contoured vanes 78.

Continuing to refer to FIG. 2, a tracing gauge probe 84 having a vane engaging finger 85 is removably located on the bench top 24. The probe 84 may be positioned to engage a contoured vane 78 at a predetermined radial distance from the center of the vane ring 12. A pointer 86 is adjustably mounted on the bench top 24 to point to the individual contoured vane 78 being bent by the bending head 16 or measured by the probe 84. The probe 84 has circuitry 84.1 configured to measure the deflection of the vane engaging finger 85 from a user defined reference point. The circuitry 84.1 is connected to the programmable controller 28 to communicate a signal proportional to the relative location of each contoured vane 78.

Continuing to refer to FIG. 2, the vane heater 36 may comprise a torch 88. The torch 88 is connected to a fuel source 88.1 (FIG. 1) in the fuel compartment 37 by a fuel hose 89. The fuel in the fuel source 88.1 (FIG. 1) may be a material such as propane, MAPP or propylene gas. The programmable controller 28 is connected to the torch 88 to control the flow of fuel to the torch 88. The torch 88 is positioned to direct heat, generated by burning fuel, onto an individual contoured vane 78.

Continuing to refer to FIGS. 1 and 2, a temperature sensor 91 is adjustably mounted on the bench top 24 to measure the temperature of an individual contoured vane 78. The temperature sensor 91 may be an infrared non-contact sensor 92 connected to digital readout 56 or a computer or the programmable control 28 (FIG. 1). The temperature sensor 91 is adjustably mounted to focus on a particular portion of an individual contoured vane 78.

Figure 3:
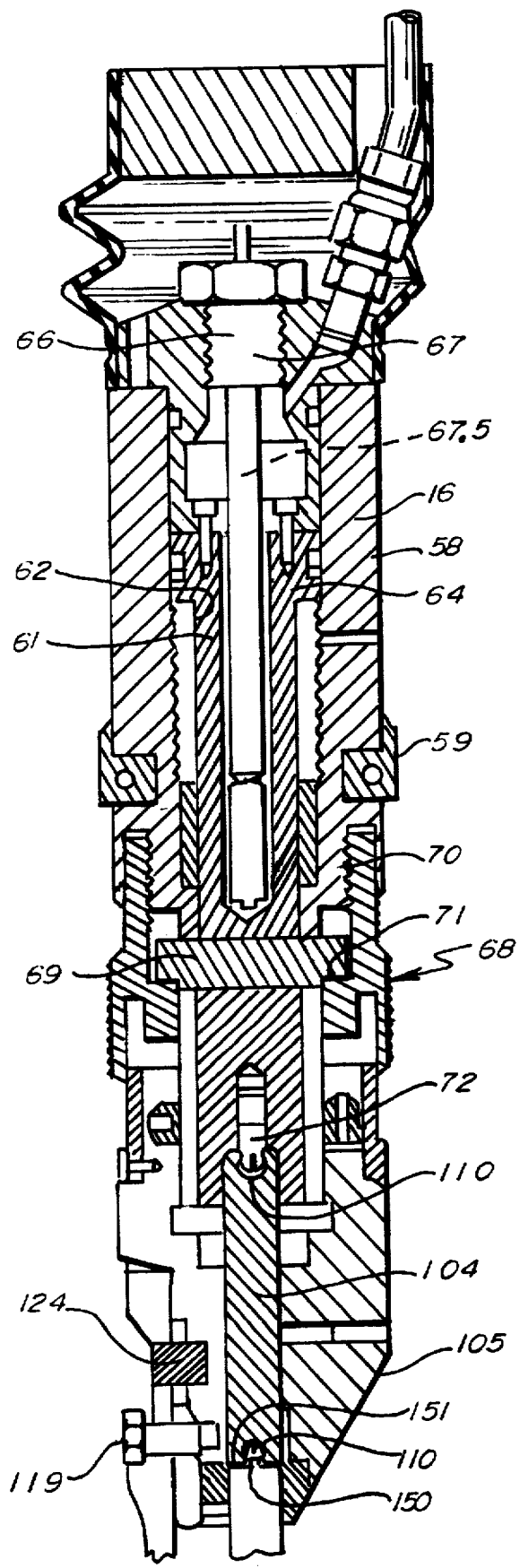
FIG. 3 is a detail section view taken at approximately 3—3 of FIG. 2.

Referring to FIGS. 2 and 3, the bending head 16 has a housing 58 rotatably contained inside a collar 59. An actuator 61 is mounted in the housing 58 to engage the jaw assembly 17 and adjust the vane ring 12. The actuator 61 moves in the housing 58 and may comprise a hydraulic cylinder 62 having a piston 64 slidably mounted therein to longitudinally travel in the housing 58. A position sensor 66 is mounted in the housing 58 to measure the position of the piston 64 with respect to the hydraulic cylinder 62. The position sensor 66 may be a linear displacement transducer 67 having a rod 67.5 extending into the hydraulic cylinder 62 to interface with the piston 64 and measure the movement of the piston 64.

Figure 5B:
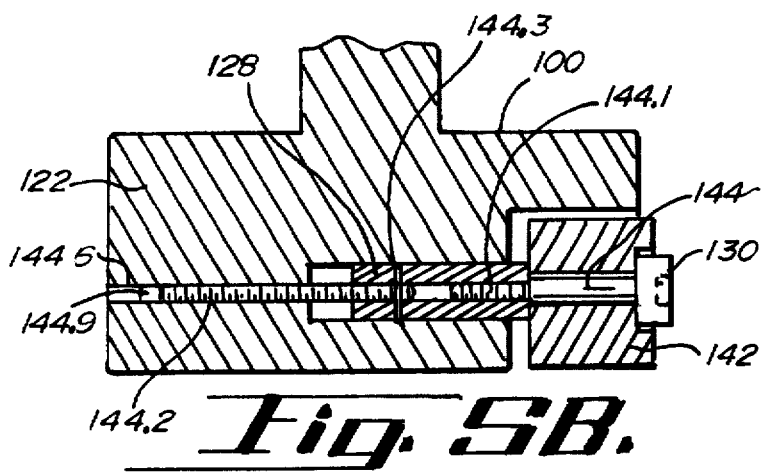
FIG. 5B is a detail section view showing the elements of FIG. 5A mounted in a fixed bending head.

Continuing to refer to FIGS. 2 and 3, the bending head 16 is attached to a hydraulic source 65 in the hydraulic compartment 37.5. The hydraulic source 65 directs hydraulic fluid into the hydraulic cylinder 62 between the piston 64 and the position sensor 66 to urge the piston 64 to move axially in the hydraulic cylinder 62. The hydraulic source 65 may be an air over oil arrangement requiring only pressurized shop air to create hydraulic pressure for the bending head 16. The bending head 16 also comprises a safety stop 68 comprising a stop bar 69 engaged in the hydraulic piston 64. An adjustment ring 70 is threadably connected to the bending head 16 to adjust the position of a stop surface 71 on the adjustment ring 70. The adjustment ring 70 is a precision 20 thread/inch graduated nut and screw assembly 70.1 which precisely positions the adjustment ring 70. The stop bar 69 will bear against the stop surface 71 on the adjustment ring 70 to limit the travel of the piston 64 in the hydraulic cylinder 62. A quick release screw 72 on the piston 64 releasably engages a shaft 104 extending from the piston 62 toward the lower end 105 of the bending head 16. The shaft 104 has a concave engagement chamber 110 to releasably engage the quick release screw 72 on the piston 64. A quarter turn screw 119 engages the housing 68 to connect the fixed jaw 100 (FIG. 2) to the bending head 16. A support bar 124 bears against the notch 126 (FIG. 5) of the fixed jaw 100 (FIG. 2) to support the fixed jaw 100.

Referring to FIGS. 4 and 4A, the bending head 16 is shown engaging a contoured vane 78 to decrease the size of the exit area 82. The trailing edge 80 of the contoured vane 78 is engaged by the jaw assembly 17 by a first foot 140 adjacent the inner nozzle ring 74, a second foot 142 adjacent the outer nozzle ring 76 and a center engagement portion 143. In the embodiment illustrated in FIG. 4, the center engagement portion 143 is moved by the actuator 61 (FIG.

3) in the bending head 16 with respect to the first foot 140 and second foot 142 to bend the trailing edge to a position closer to an adjacent contoured vane 78.1. The bending of the trailing edge 80 in this fashion will decrease the size of the exit area 82. The first foot 140, second foot 142 and center engagement portion 143 define a three-point bending engagement 145 to reduce stress on the inner nozzle ring 74 and outer nozzle ring 76 caused by the bending action. The jaw assembly 17 comprises a fixed jaw 100 and a movable jaw 102. In the embodiment illustrated, the movable jaw 102 always pushes away from the bending head 16.

Referring to FIG. 4A, the bending head 16 is shown engaging a contoured vane 78 at the trailing edge 80 to change the size of the exit area 82. As illustrated in FIG. 4A, each contoured vane 78 is individually adjusted by the bending head 16. The flow of gas through the vane ring 12 is calibrated by bending the trailing edge 80 closer to adjacent contoured vane 78.1 to close the exit area 82 reducing the distance between the trailing edge 80 of the first contoured vane 78 and the adjacent contoured vane 78.1. It should be understood, alternatively, the exit area 82 may be opened by bending the trailing edge 80 away from the adjacent contoured vane 78.1 to open the exit area 82.

Referring to FIGS. 5, 5A, 5B, and 7, a fixed jaw 100 with an adjustable foot 142 is illustrated. The fixed jaw 100 comprises a body 120 having a conical recess 118. A screw aperture 121 is formed extending through the body 120 to allow the quick turn screw 119 (See FIGS. 3 and 10) to extend through the screw aperture 121 for securing the body 120 to the bending head 16 (FIG. 2). A notch 126 is formed in the body 120. A plurality of push-offs 127 are mounted on the body 120 to facilitate quick removal of the fixed jaw 100 from the bending head 16 during replacement. The push-offs 127 comprise a spring bearing against a slidable post allowing the post to retract to be flush with the exterior of the body 120 when mounted on the bending head 16.

A vane engagement end 122 is on the body 120 having a first foot 140 in a fixed position with respect to the vane engagement end 122. A second foot 142 is adjustably and pivotally connected to the vane engagement end 122 and spaced from the first foot 140 by a distance 142.1. A first vane engagement portion 143 is formed on first foot 140. A second vane engagement portion 143.1 is formed on the second foot 142. The trailing edge 80 of the contoured vane 78 (not shown in these views) engages the first vane engagement portion 143 and the second vane engagement portion 143.1.

Figure 5A:
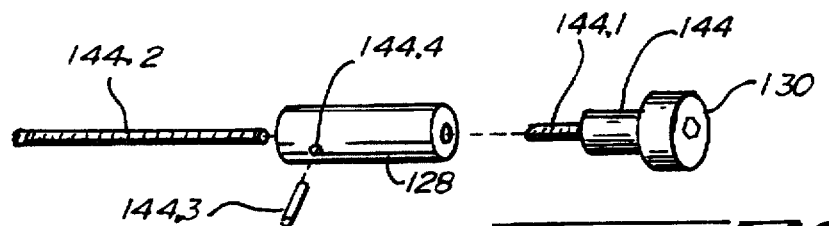
FIG. 5A is an exploded view of the shaft and screw assembly for longitudinally adjusting the position of the second foot.

Referring to FIG. 5 and 5A, the second foot 142 is pivotally and longitudinally adjustable with respect to the fixed jaw 100 and correspondingly the bending head 16. The second foot 142 is rotatable on the shank portion 144 of the screw 130. The length of the shank portion 144 corresponds closely to the width of the second foot 142 to permit such rotation without any axial play. The threaded portion 144.1 of said screw 130 is screwed tight into the threaded sleeve 128. A threaded shaft 144.2 is threadably engaged in the vane engagement end 122 at bore 144.6 and is non-rotatably pinned to the sleeve 128 by a pin 144.3 in bore 144.4. Rotation of the threaded shaft 144.2 at the tool socket 144.9, longitudinally moves the threaded shaft 144.2, the sleeve 128, and the second foot 142. Set screws 135, 136.5, 135.7 must be loosened before any such longitudinal adjustment. The pivotal or angular position of the second vane engagement portion 143.1 may be adjusted by way of loosening set screws 136, 136.5 and manually adjusting the second foot 142 to the desired pivotal angle and retightening said set screws 136, 136.5.

Referring to FIG. 6, a movable jaw 102 is illustrated having a quick release screw 150 mounted in the piston engagement surface 151. The movable jaw 102 also comprises a vane engagement head 154 having a center engagement closing portion 154.1. The embodiment illustrated in FIG. 6 is configured to reduce the size of an exit area 82 comprising an center engagement closing portion 154.1 having a convex shape.

Referring to FIGS. 5, 6 and 7, an anti-separation device 145 is shown comprising a channel 146 having a keyhole shaped opening 147 on the body 120 of the fixed jaw and the contoured head 152 and post 155 of the moveable jaw 102. The contoured head 152 is spaced from the body 153 of the movable jaw 102. The fixed jaw 100 of FIG. 5 is illustrated engaged to the movable jaw of FIG. 6 having the contoured head 152 on the movable jaw 102 slidably engaged in the channel 146 of the fixed jaw 100. The contoured head 152 is connected to the body 153 of the movable jaw 102 by post 155 which may be threadably or weldably attached to both the contoured head 152 and the body 153 of the movable jaw 102. The post 155 allows the contoured head 152 to be inserted into the assembly opening 156 (FIG. 5) of the keyhole shaped opening 147. When the movable jaw 102 is moved into bending relation with the fixed jaw 100 the contoured head 152 slides along the keyhole shaped opening 147 to maintain a spaced relation between the body 153 of the movable jaw 102 and the body 120 of the fixed jaw 100. The contoured head 152 is of a size and shape to be retained in the channel 146 as the post 155 is in the lower slot portion 157 of the keyhole shaped opening 147.

Figure 8:
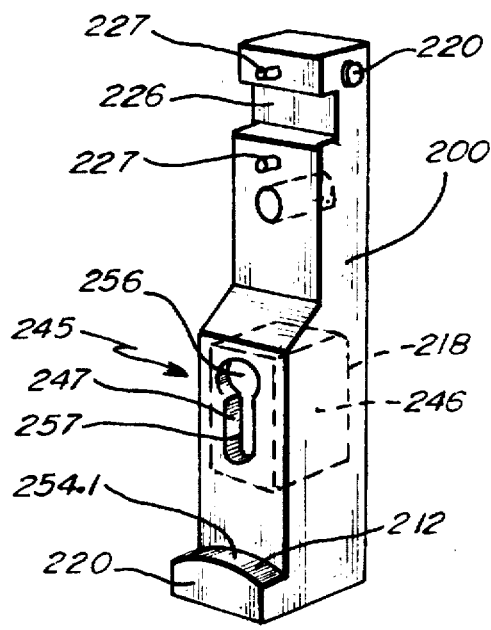
FIG. 8 is a perspective view of a fixed opening jaw.

Referring to FIG. 8, the fixed jaw 200 is illustrated having a body 218 with a conical recess 220 and a support notch 226. A plurality of push-offs 227 are mounted into and extend from the body 218 to facilitate quick removal of the fixed jaw 200 from the bending head 16. In the embodiment illustrated in FIG. 8, a vane engagement portion 221 is illustrated having a center engagement opening portion 254.1 comprising an outside surface 212 having a convex shape configured to increase the size of an exit area 82. (See FIG. 4A) The body 218 of the fixed jaw 200 comprises an anti-separation device 245 comprising a channel 246 having a keyhole shaped opening 247. The keyhole shaped opening 247 has an assembly opening 256 and a lower slot portion 257 as discussed with respect to FIGS. 5 and 7.

Figure 9:
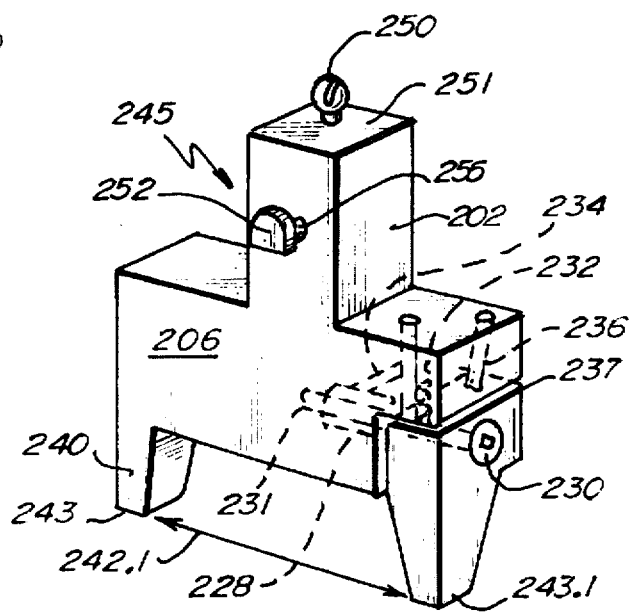
FIG. 9 is a perspective view of a movable opening jaw.

Referring to FIG. 9, the movable jaw 202 comprises a body 253 having a quick-release screw 250 extending from the piston engagement surface 251. The anti-separation device 245 comprises a contoured head 252 mounted on and spaced from the body 253 by post 255. In the embodiment illustrated in FIG. 9, a vane engaging head 206 on the movable jaw 202 comprises a first foot 240 fixed in position with respect to the body 253 of the movable jaw 202. A second foot 242 extends from the vane engagement head 206 of the movable jaw 202.

The second foot 242 is adjustably attached to the first foot 240 and separated by a distance 242.1. The second foot 242 is adjusted by a bore 229 formed in the vane engagement head 206 to slidably receive a slidable member 228 on the second foot 242. An adjustment screw 231 extends through the slidable member 228 and extends into the bore 229 to threadably engage the adjustment threads 231 in the bore 229. A first set screw 234 is mounted in the vane engagement head 206 to bear against slidable member 228 to hold the second foot 242 in a predetermined location. Two adjustment screws 232, 236 are mounted in the vane engagement head 206 to bear against the external portion 237 of the second foot 242.

Continuing to refer to FIG. 9, the movable jaw 202 may further comprise a first opening engagement portion 243 on first foot 240. A second opening engagement portion 243.1 is on second foot 242. The contoured shape of the first opening engagement portion 243 may be different from the contoured shape of second opening engagement portion 243.1.

Referring to FIG. 10, the jaw assembly 17 is illustrated on the bending head 16. A positioner screw 160 with a conical engagement head 161 is on the bending head 16 for engaging the conical recess 118. The positioner screw 160 is positioned off-center from conical recess 118 in the lower left quadrant of the recess as shown in the view of FIG. 10. This engagement with the conical recess urges the fixed jaw 100 downwardly and toward the bending head 16 to secure a consistent and uniform engagement with the bending head 16. The quarter turn screw 119 secures the fixed jaw to the bending head 16. The fixed jaw 100 also engages the support bar 124 in notch 126 to support the fixed jaw 100 when the movable jaw 102 is moved downwardly, as indicated by the arrow 249, to engage a contoured vane 78 between the movable jaw 102 and the fixed jaw 100.

Referring to FIGS. 1 and 2, in operation, vane ring 12 is placed on the programmable rotary table 32 and removably attached by the quick-action chuck 33.2. The probe 84 is moved into position having the vane engagement finger 85 engaging a selected contoured vane 78 in the vane ring 12. The selected contoured vane 78 is randomly selected to be the reference vane for that individual vane ring 12. The pointer 86 is positioned to indicate the selected contoured vane 78 engaged by the probe 84. The pointer 86 will be used as a reference to indicate to the operator a contoured vane 78 to be bent by the bending head 16. The programmable controller 28 is signaled to command the rotary table 32 to rotate the vane ring 12 on the programmable rotary table 32 allowing the vane engagement finger 85 to sequentially ride along each adjacent contoured vane 78. As the vane engagement finger 85 runs past the trailing edge 80 of each contoured vane 78 the probe 84 measures the height of the trailing edge 80 and sends a corresponding signal to the programmable controller 28. The vane ring 12 is rotated on the programmable rotary table 32 until the rotation sensor 33.5 indicates all the contoured vanes 78 have been measured by the randomly selected reference vane 78 traveling a complete 360° revolution.

The bending head 16 is positioned adjacent to the vane ring 12 bringing the jaw assembly 17 into position proximate to a contoured vane 78. If the exit area 82 (FIG. 4A) is to be closed, the jaw assembly having a fixed jaw 100 similar to the fixed jaw 100 in FIG. 5 and a movable jaw 102 similar to the movable jaw in FIG. 6 is used to bend the trailing edge 80 of the contoured vanes 78. The set screw 135 is threadably backed off from its position holding the slidable member 128 in position. The jaw assembly 17 is held proximate to the trailing edge 80 of a contoured vane 78 in the vane ring 12. The desired adjustment (shown in FIG. 4) is to have one foot adjacent the inner nozzle ring 74 and the other foot adjacent the outer nozzle ring 76 while the movable jaw 102 bears against the contoured vane 78 at a midpoint between the feet.

Referring to FIGS. 4 and 5, the position of the first foot 140 and second foot 142 are first compared to the position of the inner nozzle ring 74 and the outer nozzle ring 76. If the distance 142.1 needs to be changed, the threaded shaft 144.2 or the adjustment screw 130 is turned by an external tool (not shown) to threadably move the second foot 142 closer to or farther from the first foot 140 as desired.

The second foot 142 may be rotatably adjusted as described above to properly engage the fillets 155 where the vanes meet the vane rings.

Referring to FIGS. 1 and 2, the programmable control 28 is configured to hold information relative to the bending operation of the vane ring 12. The programmable control 28 commands the programmable rotary table 32 to position one contoured vane 78 proximate to the torch 88 to be heated. The torch 88 is engaged causing the contoured vane 78 to be heated to a elevated temperature. The programmable controller 28 commands the programmable rotary table 32 to position the heated contoured vane 78 proximate to the temperature sensor 91. The temperature sensor 91 measures the temperature of the heated contoured vane 78 to determine if the contoured vane 78 had a temperature within a range suitable for bending.

Continuing to refer to FIGS. 1 and 2, if the contoured vane 78 is too hot or too cold, the control 26 may command the rotary table 32 to position a different contoured vane 78 adjacent to the torch 88 for heating or to wait until the contoured valve 78 cools to a temperature in a proper temperature range for bending. If the temperature of the contoured vane, heated by the torch 88, is within the range suitable for bending, the control 26 commands the programmable rotary table 32 to position the heated contoured vane 78 adjacent to the pointer 86 for bending.

The operator manipulates the bending head 16 by grasping the gimbal arm 38 and moving the bending head along the first horizontal axis, second horizontal axis, vertical axis, first rotation axis, the pivotal axis and the alignment axis to engage the trailing edge 80 of the heated contoured vane 78 with jaw assembly 17. The foot switch 54 is activated signaling control 26 to cause the bending head 16 to engage the contoured vane 78 with low pressure.

Referring to FIGS. 3–10, the position sensor 66 measures the position of a movable jaw 102 with respect to the fixed jaw 100. The position sensor 66 thereby measures the relative position of the first and second feet 140, 142 respectively with respect to the center engagement closing portion 154.1 and consequently the position of the trailing edge 80 prior to the actuator 61 imparting a bending force to the jaw assembly 17. The programmable controller 28 may be configured to hold information relative to the elasticity or spring back of the contoured vane 78 in the vane ring 12. This information regarding the spring back may be used to select the height of bend caused by the movable jaw 102 with the actuator 61 bearing against the center engagement closing portion 154.1 with respect to the first foot 140 and the second foot 142 on the jaw assembly 17 a predetermined distance as measured by the position sensor 66 in the bending head 16. For example, if a trailing edge 80 is to be bent 0.020 inches, the elasticity index of the contoured vane 78 may require the bending head 16 to bend the trailing edge 80 a distance of 0.060 inches in order for the trailing edge 80 to return to a post bending position approximately 0.020 inches from its prebending position.

Referring to FIGS. 4 and 4A, the actuator 61 releases the bending force bearing against the movable jaw 102 to hold the first foot 140, the second foot 142 and the center engagement closing portion 154.1 bearing against the trailing edge 80 to measure the bent position of the trailing edge 80. This process is repeated until each of the contoured vanes 78 has been bent by the bending head 16. The programmable controller 28 records the pre-bending position and the post bending position of each contoured vane 78 and may numerically display the relationship of each of the contoured vanes 78 on the operator interface 30.

Referring to FIGS. 3, 4A, 8 and 9, if the exit area 82 is to be opened, the jaw assembly 17 illustrated in FIGS. 8 and 9 is used to engage the trailing edge 80 of the contoured vanes 78. The procedure for positioning the first foot 240 and the second foot 242 with respect to the inner nozzle ring 74 and the outer nozzle ring 76 is very similar to the procedure described above. It should be understood from the description, drawings and claims that additional adjustments to the jaw assembly 17 may be used with the vane adjustment machine.

The vane rings may be segmented whereby several segments form a whole 360° vane ring. When used herein, vane ring refers to vane ring segments as well as whole (360°) vane rings.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention. For example, jaws where both feet are adjustable longitudinally and angularly are anticipated and intended to be included within the scope of the invention.

What is claimed:

1. A vane adjustment machine for adjusting a vane ring having an inner nozzle ring and a plurality of contoured vanes extending radially outward from the inner nozzle ring, each contoured vane having a trailing edge defining an exit opening between the trailing edge and an adjacent one of the plurality of contoured vanes, the vane adjustment machine comprising:
    a) a support structure;
    b) a rotary table mounted on the support structure, the vane ring removably mounted on the rotary table;
    c) a free-floating suspension supported by the support structure and mounted above the rotary table;
    d) a bending head supported by the free-floating suspension, an actuator in the bending head; and
    e) a jaw assembly on the bending head engaging a trailing edge on one of the plurality of contoured vanes, the jaw assembly having a first foot, a second foot and a center engagement portion between the first foot and second foot, the first foot spaced from the second foot by a distance, the second foot slidably adjustable with respect to the first foot thereby changing the distance between the first foot and the second foot, the actuator bearing against the jaw assembly to move the center engagement portion with respect to the first foot and second foot.

2. The invention of claim 1 further comprising a position sensor in the bending head, the position sensor in communication with the actuator for measuring the movement of the center engagement portion with respect to the first foot and second foot.

3. The invention of claim 1 further comprising a stop bar mounted on the actuator, an adjustment ring on the bending head having a stop surface, a graduated nut and screw assembly connecting the adjustment ring to the bending head for adjusting the position of the stop surface with respect to the stop bar whereby travel of the actuator is limited in the bending head by the stop bar bearing against the stop surface on the adjustment ring.

4. The invention of claim 1 wherein one of the feet is rotatably adjustable.

5. The invention of claim 1 further comprising:
    a) a gauge probe mounted adjacent to the rotary table, the gauge probe having a vane engagement finger for bearing against and measuring the relative position of the trailing edge of each of the plurality of contoured vanes; and
    b) a programmable controller connected to the gauge probe, the programmable controller further connected to the rotary table, the programmable controller having circuitry configured to rotate the rotary table holding the vane ring and receive a signal from the gauge probe.

6. The invention of claim 1, the free-floating suspension further comprising a trolley movably engaged on a first trolley track defining a first horizontal axis of motion.

7. The invention of claim 6, the free-floating suspension further comprising:
    an upper support arm on the first trolley track, the upper support arm having a linear slide on each end, a pair of substantially parallel slide rails mounted above the rotary table, each linear slide slidably engaging one of the pair of substantially parallel slide rails to move the bending head in a second horizontal axis of motion.

8. The invention of claim 1, the free-floating suspension further comprising a gimbal arm, a Y-shaped bracket rotatably mounted on the gimbal arm defining a first rotational axis of motion, the Y-shaped bracket connected to the bending head.

9. The invention of claim 1, the free-floating suspension further comprising a cable attached to the bending head, a balancer attached to the cable for vertically adjusting the position of the bending head with respect to the vane ring, such that the bending head may be adjustably moved and supported along a vertical axis of motion.

10. The invention of claim 7 further comprising a second support member on the Y-shaped bracket, a third support member on the Y-shaped bracket, the second and third support members on the Y-shaped bracket pivotally engaging the bending head, the second and third support members defining a pivotal axis of motion of the bending head.

11. The invention of claim 10 further comprising a collar on the bending head, the collar attached to the free-floating suspension for rotatably adjusting the position of the jaw assembly with respect to the trailing edge of one of the plurality of contoured vanes defining an alignment axis of motion of the bending head.

12. The invention of claim 1 further comprising a vane heater for heating a contoured vane.

13. The invention of claim 12 further comprising a temperature sensor proximate to the vane assembly for measuring a temperature of the contoured vane heated by the vane heater.

14. A vane adjustment machine for adjusting one of a plurality of contoured vanes on a vane ring, the vane ring having an inner nozzle ring and an outer nozzle ring, each of the contoured vanes having a trailing edge, the vane adjustment machine comprising:
    a) a support structure;
    b) a rotary table for supporting the vane ring, the rotary table attached to the support structure;
    c) a bending head comprising a housing, an actuator in the housing and a position sensor in the housing and in communication with the actuator, the actuator movable within the housing, the bending head supported by the support structure for placing said bending head adjacent to the rotary table; and
    d) a jaw assembly comprising a movable bending jaw on the actuator and a fixed bending jaw on the housing, one of the jaws having a first foot and a second foot, the other jaw having a contoured center vane engagement portion positioned between the first foot and the second foot, the second foot spaced from the first foot by a distance, the distance between the first foot and the second foot adjustable, the second foot angularly adjustable with respect to the first foot the actuator bearing against the movable jaw to move the movable jaw with respect to the fixed jaw, the position sensor measuring the position of the movable jaw with respect to the fixed jaw.

15. The invention of claim 14 the fixed jaw further comprising a body and a vane engagement portion, the first foot and the second foot on the vane engagement portion, the center engagement portion on the movable jaw having a convex shape.

16. The invention of claim 15 further comprising a bore in the vane engagement portion, a slidable member on the second foot slidably engaged in the bore whereby the distance may be changed by moving the slidable member in the bore.

17. The invention of claim 15 further comprising an angle adjustment set screw in the vane engagement portion, the angle adjustment set screw bearing against the second foot to rotate the second foot with respect to the body of the fixed jaw and rotate the slidable member in the bore.

18. The invention of claim 15 further comprising an adjustment screw longitudinally extending in the slidable member, the bore having adjustment threads formed therein, the adjustment screw extending through the slidable member to threadably engage the adjustment threads whereby the adjustment screw threadably traverses the adjustment threads to bear against and urge the second foot to move with respect to the first foot changing the distance.

19. The invention of claim 14 further comprising a anti-separation device slidably connecting the movable jaw to the fixed jaw to maintain a spaced relation between the fixed jaw and the movable jaw.

20. A vane adjustment machine for adjusting one of a plurality of contoured vanes on a vane ring, the vane ring having an inner nozzle ring and an outer nozzle ring, each of the contoured vanes having a trailing edge, the vane adjustment machine comprising:

a) a bench top supporting the vane ring;

b) a free-floating suspension suspended over the vane ring having a trolley defining a first and second horizontal axis of motion, the first horizontal axis of motion substantially perpendicular to the second horizontal axis of motion, a balancer on the trolley having a cable adjuster, a cable connected to the cable adjuster, the cable extendible from the cable adjuster to a predetermined length defining a vertical axis of motion, a gimbal arm on the cable, the gimbal arm having a Y-shaped bracket rotatably attached defining a rotational axis of motion about a horizontal axis;

c) a bending head having a housing, a collar rotatably mounted on the housing, the collar pivotally connected to the Y-shaped bracket, a hydraulic cylinder in the housing, a hydraulic piston slidably mounted in the hydraulic cylinder, a position sensor in the housing, the position sensor engaged to the piston for measuring the travel of the piston in the hydraulic cylinder; and d) a jaw assembly on the bending head, the jaw assembly having a movable jaw attached to the piston and a fixed jaw rigidly attached to the housing, the jaw assembly further comprising a first foot for engaging the trailing edge of a contoured vane adjacent one of the nozzle rings, a second foot on the jaw assembly for engaging the trailing edge of a contoured vane adjacent the other of the nozzle rings, a center engagement portion on the jaw assembly for engaging the trailing edge of a contoured vane, the first foot separated from the second foot by a distance, a sliding member on the second foot slidably mounted in a bore proximate to the first foot, an adjustment screw in the second foot extending through the slidable member, adjustment threads in the bore engaging the adjustment screw, a set screw threadably extending into the bore to engage the sliding member whereby the distance between the first foot and the second foot may be changed by disengaging the slidable member with the set screw, turning the adjustment screw urge the slidable member to move thereby changing the distance between the first foot and the second foot by the adjustable screw traversing the adjustment threads in the bore.

* * * * *

UNITED STATES PATENT AND TRADEMARK OFFICE
CERTIFICATE OF CORRECTION

PATENT NO. : 5,713,233
DATED : Feb. 3, 1998
INVENTOR(S) : James F. McCarthy, Loren L. Davis It is certified that error appears in the above-identified patent and that said Letters Patent is hereby corrected as shown below:

On the title page item [57],

Abstract, line 18: please delete the hyphen after "the" and in its place put a space col. 1, line 58: please add a space after "axially,"

Signed and Sealed this

Eighteenth Day of July, 2000

Attest:

Q. TODD DICKINSON

*Attesting Officer*     *Director of Patents and Trademarks*